United States Patent [19]

Cadden

[11] Patent Number: 5,016,906
[45] Date of Patent: May 21, 1991

[54] SUSPENSION ADJUSTMENT

[75] Inventor: Robert L. Cadden, Victoria, Australia

[73] Assignee: The Boler Company, Itasca, Ill.

[21] Appl. No.: 461,025

[22] Filed: Jan. 4, 1990

[51] Int. Cl.⁵ ............................................. B60G 11/10
[52] U.S. Cl. .................... 280/680; 267/260; 267/265; 280/686; 280/699
[58] Field of Search ............... 280/676, 677, 678, 682, 280/683, 711, 712, 680, 686; 267/31, 45, 51, 242, 244, 247, 229, 232, 265, 260

[56] References Cited

U.S. PATENT DOCUMENTS

| 987,833 | 3/1911 | Selden | 267/45 |
|---|---|---|---|
| 1,111,015 | 9/1914 | Evans | 267/29 |
| 1,265,825 | 5/1918 | Sprague | 267/265 |
| 1,463,219 | 7/1923 | Lutz | 267/260 |
| 1,541,526 | 6/1925 | Pierce | 267/242 |
| 2,102,420 | 12/1937 | Kogstrom | 267/245 |
| 2,105,541 | 1/1938 | Leighton | 280/661 |
| 3,833,236 | 9/1974 | Davis et al. | 280/676 |
| 4,500,110 | 2/1985 | McWhorter et al. | 280/680 |
| 4,706,988 | 11/1987 | Young | 280/676 |
| 4,762,337 | 8/1988 | Raidel | 280/688 |
| 4,846,495 | 7/1989 | Laidely | 280/676 |

FOREIGN PATENT DOCUMENTS 963370 7/1964 United Kingdom ................ 267/265

Primary Examiner—Richard A. Bertsch
Attorney, Agent, or Firm—Lockwood, Alex, FitzGibbon & Cummings

[57] ABSTRACT

A tandem axle suspension wherein alignment of one axle relative to the other may be adjusted. The suspension includes a pair of spring hangers attached to each side of the chassis frame and a leaf spring assembly interconnecting each pair of spring hangers. Each leaf spring assembly includes a leaf with a spring eye at one end and a spring pin extending through the spring eye and through a transverse aperture in an aperture-providing insert rotatably mounted in the spring hanger to which the end of the leaf spring with the spring eye is interconnected. The spring hanger in which the insert is mounted has an upper portion by which it is attached to the vehicle chassis frame and depending portion having a transverse opening in which the insert is rotatably mounted. The depending portion is transversely bifurcated by a slot extending upwrdly into the transverse opening. A horizontal bolt-receiving opening extends fore-and-aft through the depending portion and fore-and-aft through an upwardly extending fore-and-aft slot in the lower portion of the insert. A clamping bolt extends through the bolt-receiving opening. The fore-and-aft slot in the insert straddles the calmping bolt with sufficient upward clearance to permit the insert to be rotated through a substantial angle. The outboard side of the insert has a tool-engageable formation thereon. Since the aperture in the insert is eccentrically located fore-and-aft adjustment between the leaf spring and the chassis may be obtained by rotating the insert.

7 Claims, 3 Drawing Sheets

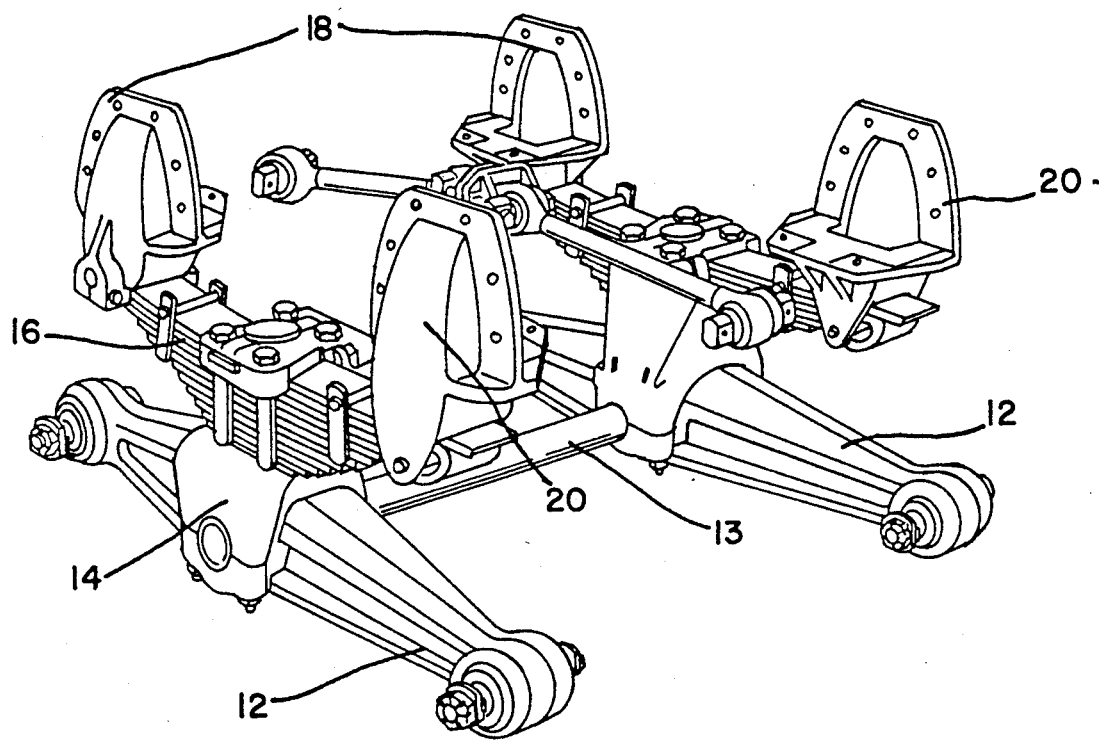
FIG_1
PRIOR ART

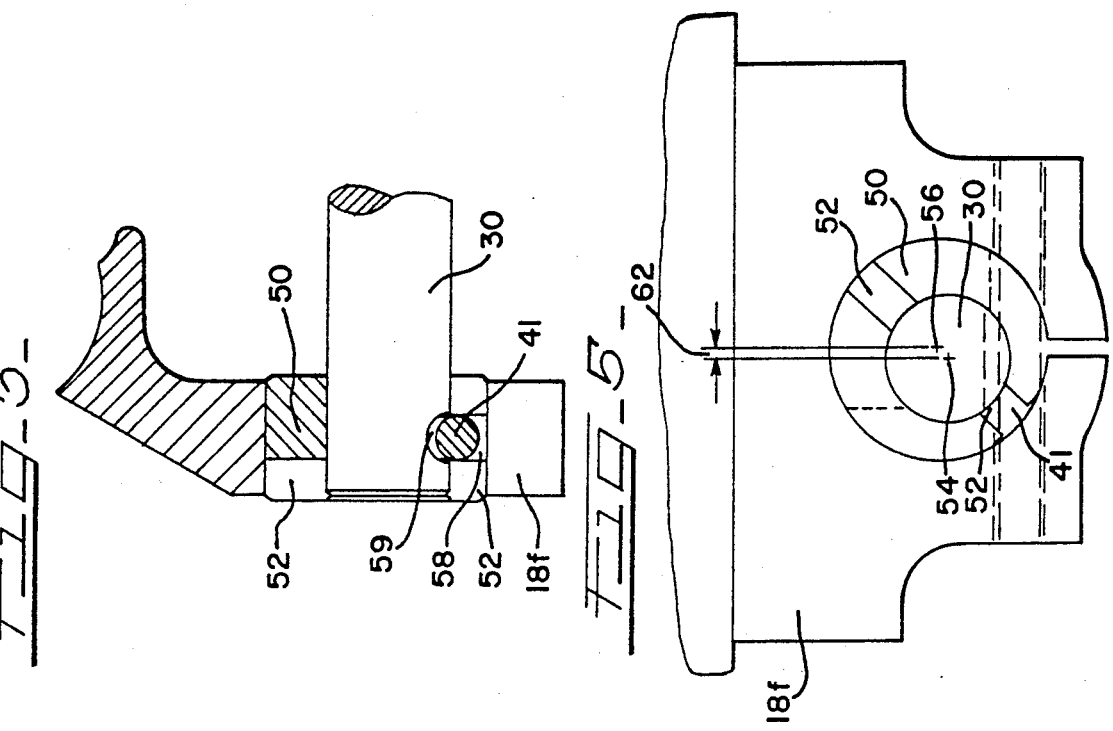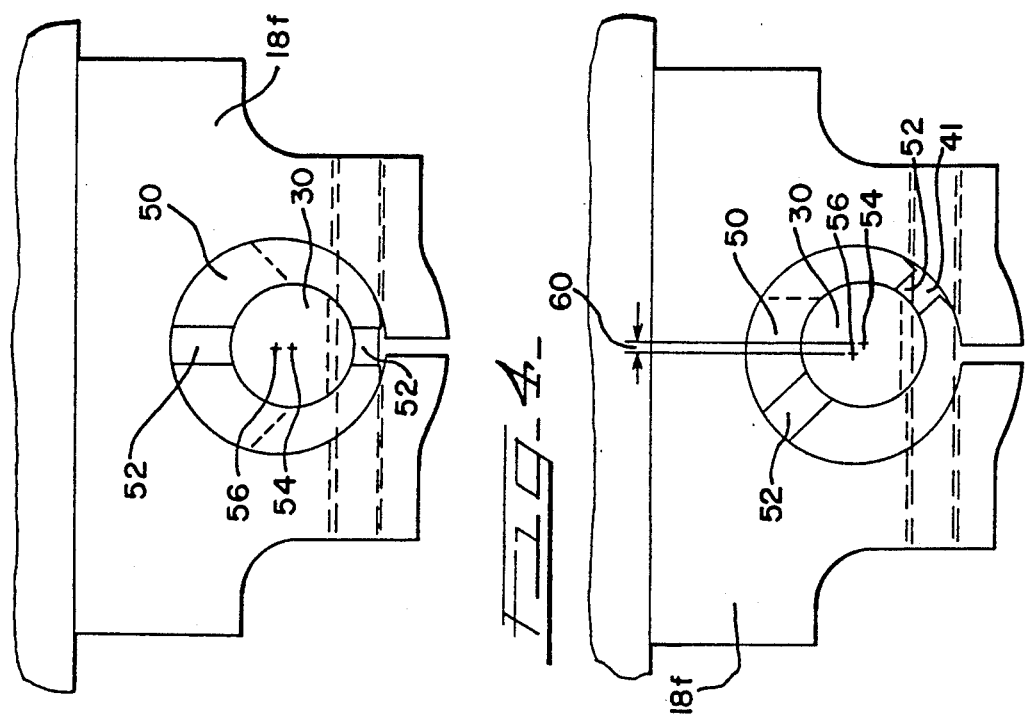

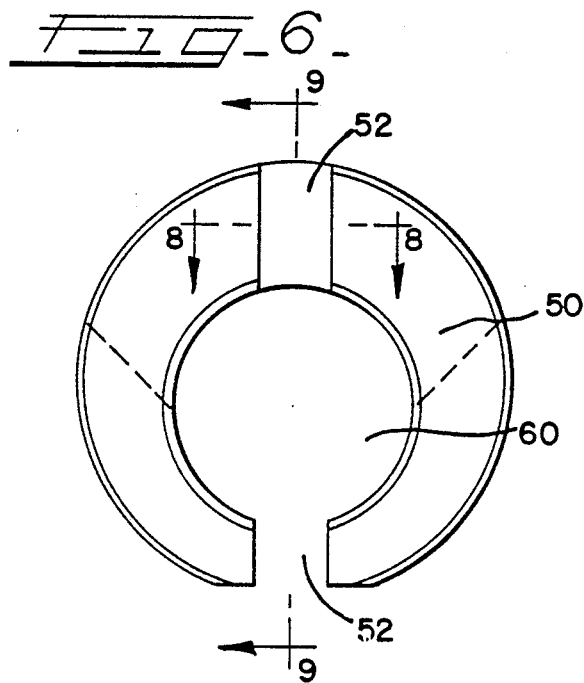
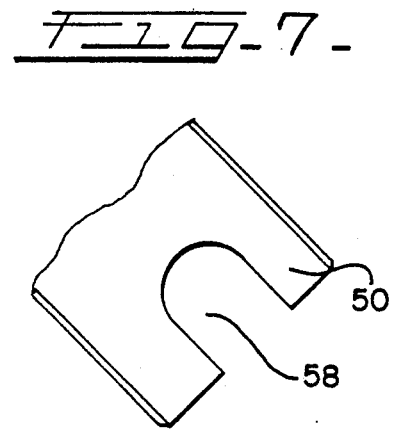
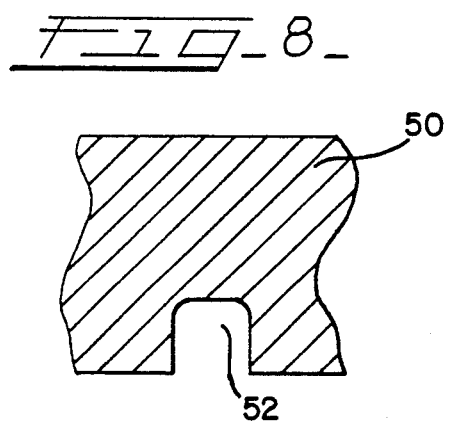
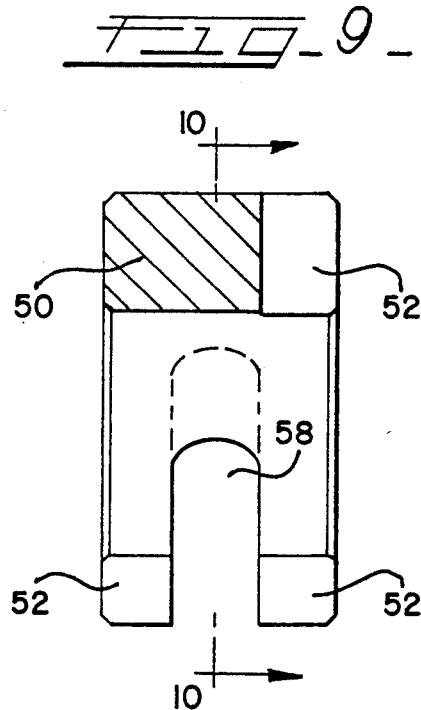
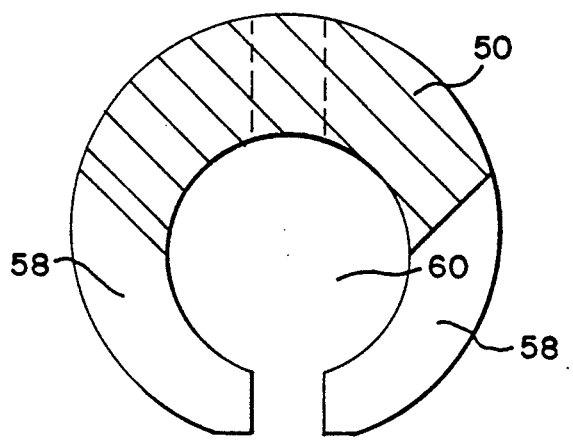

SUSPENSION ADJUSTMENT

FIELD OF THE INVENTION

This invention relates to vehicle suspension systems and more particularly, though not exclusively, to means for adjusting vehicle suspension systems.

BACKGROUND

Known tandem drive vehicles, for example, use suspensions incorporating equalizing beams and leaf springs to cushion road shocks and to distribute weight between the tandem drive axles, thereby improving traction. The springs are generally mounted on saddle assemblies above the equalizing beams and connected at the front ends to front spring hangers with spring eye pins or spindles (hereinafter called "spring pins") through the spring eyes. The rear ends of the springs need have no rigid attachment to the rear spring hangers and may be free to move forward and backward to accommodate spring deflection. The rear hangers may be provided with cam surfaces which allow for this movement of the spring. Spring hangers may be affixed to the frame or chassis of the vehicle by conventional fixing means such as bolts, washers and nuts.

It is generally seen advantageous the tandem drive axles be parallel to each other and properly aligned with respect to the longitudinal axis of the truck frame or chassis. Prior suspension systems have been found wanting in satisfactory means for adjustment of the alignment of the axle with respect to the vehicle frame of chassis. The need for such adjustment has arisen in the last 2-3 years as a result of improvements in alignment measurement techniques, especially as a result of using laser-based equipment. If the axles and the wheels are properly aligned with the longitudinal axis of the vehicle frame, tire wear may be minimized and significant savings in fuel comsumption may also be achieved.

Two methods have been developed in an effort to provide some form of alignment adjustment. Those methods have related on the one hand to altering the position of the saddle assembly with respect to the leaf spring assembly and on the other hand, to fitting an eccentric adaptor at the ends of the equalizing beams where they are attached to the vehicle axles. The former method can be time consuming and arduous as it usually involves disassembling the saddle assembly and the leaf spring assembly.

SUMMARY OF THE INVENTION

This invention is concerned with different means for alignment adjustment and relates to moving the spring pin(s) relative to those spring hanger(s) containing the spring pin(s). It is believed that methods of adjustment according to the present invention provide a safer and more effective means of alignment adjustment. The resulting adjustment is believed to be more durable than can generally be achieved by known methods. It is anticipated that this invention may be used for vehicles having single or multiple drive axles, as well as for non-drive axles or vehicles, including trailers. With suitable modifications, the invention may be used for suspensions incorporating other than leaf springs.

It is an object of this invention to provide for adjusting the alignment of vehicle axles with respect to the vehicle frame.

According to one aspect of the invention there is provided a suspension for a vehicle having a chassis frame and at least one pair of opposed transport wheels on opposite sides of a fore-and-aft axis of said vehicle, an axle extending transversely between the wheels of each said pair, said suspension including a pair of spring hangers attached to each opposite side of said chassis frame, and a leaf spring assembly on each side of said chassis frame interconnecting each said pair of spring hangers with opposite ends of said axle in resilient load transfer relationship, each said leaf spring assembly having a leaf spring with a spring eye at one end and a spring pin extending through said spring eye and through an aperture in an aperture-providing means rotatably mounted in one of said spring hangers to which said end of said leaf with said spring eye is interconnected, said one of said spring hangers having an upper portion by which it is attached to said chassis frame and a depending portion having a transverse opeing in which said aperture-providing means is rotatably mounted, said depending portion being bifurcated from the bottom up in a transverse direction by a slot extending upwardly into said transverse opening therein, a horizontal bolt-receiving opening extending fore-and-aft through said depending portion and fore-and-aft through the lower portion of said aperture-providing means, a clamping bolt extending through said bolt-receiving opening, said lower portion of said aperture-providing means being bifuracted from the bottom up by a fore-and-aft slot which straddles said clamping bolt with sufficient upward clearance permitting said aperture-providing means to be rotated through a substantial angle, the outboard side of said aperture-providing means having a tool-engageable formation thereon to permit adjustment thereof by a tool and the aperture in said aperture-providing means being eccentrically located therein.

Throughout the description and claims the terms "horizontal", "vertical", "transverse" and the like shall read as referring to the situation where the chassis frame is in the normal orientation when a vehicle it forms part of is at rest on a horizontal surface.

Preferably the transverse opening in the depending portion of the spring hanger is cylindrical and the aperture-providing means is in the shape of cylindrical plug fitted rotatably in the transverse opening. Further, preferably the fore-and-after slot in the aperture-providing means permits the aperture-providing means to be rotated through an angle of up to 90 degrees, and, advantageously, the end surfaces of the fore-and-aft slot may be concave and oriented to complementarily engage the upper side of the clamping bolt. Advantageosly, the center of the aperture in the aperture-providing means is located vertically below the coinciding centers of the transverse opening and the aperture-providing means when the aperture-providing means is in its mid-position and the center of the aperture is displaced horizontally and vertically as the aperture-providing means is rotated, the vertical displacement being substantially less than the horizontal.

It is also preferred that the tool-engageable formation on the outboard side of the aperture-providing means comprises spanner wrench receiving slots.

Further, it is of advantage that the spring pin is provided with a notch in the underside which fits over the top of the clamping bolt.

In order that the invention may be more clearly understood, an embodiment is described with reference to the accompanying non-limiting drawings in which:

FIG. 1 is a perspective drawing of a tandem axle suspension according to the prior art;

FIG. 2 is a partial side view of an adjustable spring hanger according to one aspect of the invention;

FIG. 3 is a partial sectional view of an adjustable spring hanger as shown in FIG. 2;

FIG. 4 is a side view of part of an adjustable spring hanger according to the invention showing the spring pin in a position rearward of the means position;

FIG. 5 is a side view of port of a spring hanger according to the invention showing the spring pin in a position forward of the mean position;

FIG. 6 is an elevation view of an aperture-providing means (hereinafter called "mounting means") according to one aspect of the present invention;

FIG. 7 is a view along line X of FIG. 6;

FIG. 8 is a sectional view along line C—C of FIG. 6;

FIG. 9 is a sectional view along line A—A of FIG. 6;

FIG. 10 is a sectional view along line B—B of FIG. 9.

In FIG. 1, equalizing beams 12 can pivot on a cross tube 13 which is mounted on saddle assemblies 14. Leaf springs 16 are mounted on saddle assemblies 14 above equalizing beams 12 and are connected at the front ends thereof to front spring hangers 18. The rear ends of the springs have no rigid attachment to the rear spring hangers 20 and are free to move backwards and forwards to accommodate spring deflection.

In FIG. 2, front spring hanger 18f may be releasably fixed to a vehicle frame (not shown) by bolts, nuts and washers (not shown), or by any other conventional fixing means. The spring pin 30 is mounted eccentrically for limited rotation in mounting means 50. Mounting means 50 is provided with a tool-engagable formation in the form of cut-outs 52 on the outboard surface to accommodate a tool permitting the mounting means to be rotated in either a forwards direction or in a rearwards direction with respect to the spring hanger 18f. The extent of this rotation is limited by the interaction of the mounting means with the shaft of a clamping bolt (not shown here). Numerals 54 and 56 designate respective longitudinal axes of spring pin 18f and mounting means 50. Here said axes are co-planar, with spring pin and the mounting means being in "mean" position.

In FIG. 3, numerals 18f, 30, 50 and 52 are as hereinbefore described. Numeral 41 designates a clamping bolt, 58 designates a fore-and-aft slot or cut-out in the mounting means 50 to accommodate part of clamping bolt 41 and 59 designates a notch in spring pin 30 to partly accommodate clamping bolt 41. As aforesaid, in both FIG. 2 and FIG. 3 spring pin 30 and mounting means 50 are in mean position and there is no significant interaction between mounting means 50 and clamping bolt 41 which is received in slot 58. When the clamping bolt is tightened the mounting means is constrained from rotating within the spring hanger by the tightening or clamping of the arms of the spring hanger.

In FIGS. 4 and 5, numerals 18f, 30, 50, 52, 54, 56 and 58 are as previously described. In FIG. 4 spring pin 30 is shown in a position rearward of the mean position. This is achieved by rotating mounting means in one sense with respect to the spring hanger until the desired relative rearward and downward displacement of the spring pin 30 is achieved. The extent of horizontal displacement is indicated by distance 60. The mounting means 50 may then be fixed in position by tightening the clamping bolt. The extent of rotation of the mounting means is limited by the extent of cut out 58. In FIG. 5, forward adjustment of spring pin 30 is achieved by rotation of mounting means 50 in the opposite sense until the desired relative forward and downward displacement of spring pin 30 is reached. The extent of horizontal displacement is indicated by distance 62. Once again, the mounting means may be locked in place by means of the clamping bolt (not shown here). In the embodiment described above it is envisaged that a forward or rearward displacement of the spring pin of up to 2.8 mm from the mean position may be achieved. It can be seen that is this substantial the amount of horizontal displacement is greater than the amount of vertical displacement.

In FIG. 6, numerals 50 and 52 are as previously described. In FIG. 7, 50 denotes the mounting means and numeral 58 designates part of the fore-and-aft slot which, in use, straddles and partly receives the clamping bolt 41 in the manner shown in FIG. 3. In FIG. 8, 52 denotes part of the tool-engageable cut-out.

In FIG. 9, 52, 50 and 58 are as hereinbefore described.

In FIG. 10, the extent of the fore-and-aft slot is as shown by the unshaded areas 58. The numeral 60 designates the aperture in the mounting means for receiving the spring pin.

It is a feature of the foregoing embodiment that spring pin 30 may rotate to a limited extent relative to mounting means 50 so that a spring pin lubrication hole (not shown) stays in a convenient position. The clamping bolts also assist in providing essential axial location for the spring pin. It is preferred that vertical movement of the spring pin that a consequent to rotation of the mounting means be kept to a minimum.

I claim:

1. A suspension for a vehicle having a chassis frame and at least one pair of opposed transport wheels on opposite sides of a fore-and-aft axis of said vehicle, an axle extending transversely between the wheels of each said pair, said suspension including a pair of spring hangers attached to each opposite side of said chassis frame, and a leaf spring assembly on each side of said chassis frame interconnecting each said pair of spring hangers with opposite ends of said axle in resilient load transfer relationship, each said leaf spring assembly having a leaf spring with a spring eye at one end and a spring pin extending through said spring eye and through an aperture in an aperture-providing means rotatably mounted in one of said spring hangers to which said end of said leaf with said spring eye is interconnected, said one of said spring hangers having an upper portion by which it is attached to said chassis frame and a depending portion having a transverse opening in which said aperture-providing means is rotatably mounted, said depending portion being bifurcated from the bottom up in a transverse direction by a slot extending upwardly into said transverse opening therein, a horizontal bolt-receiving opening extending fore-and-aft through said depending portion and fore-and-aft through the lower portion of said aperture-providing means, a clamping bolt extending through said bolt-receiving opening, said lower portion of said aperture-providing means being bifurcated from the bottom up by a fore-and-aft slot which straddles said clamping bolt with sufficient upward clearance permitting said aperture-providing means to be rotated through a substantial angle, the outboard side of said aperture-providing means having a tool-engageable formation thereon to permit adjustment thereof by a tool and the aperture in said aperture-providing means being eccentrically located therein.

2. A suspension as claimed in claim 1 wherein said transverse opening in said depending portion is cylindrical and said aperture-providing means is in the form of a cylindrical plug fitting rotatably in said transverse opening.

3. A suspension as claimed in claim 2 wherein said fore-and-aft slot in said aperture-providing means permits it to be rotated through an angle of up to 90 degrees.

4. A suspension as claimed in claim 2 wherein the end surfaces of said fore-and-aft slot in said aperture-providing means are concave and oriented to complementarily engage the upper side of said clamping bolt.

5. A suspension as claimed in claim 3 wherein the center of said aperture in said aperture-providing means is located vertically below the coinciding centers of said transverse opening and said aperture-providing means when said aperture-providing means is in its mid-position and said center of said aperture is displaced horizontally and vertically as said aperture-providing means is rotated, the vertical displacement being substantially less than the horizontal.

6. A suspension as claimed in claim 2 wherein said tool-engageable formation on the outboard side of said aperture-providing means comprises spanner wrench receiving slots.

7. A suspension as claimed in claim 2 wherein said spring pin has a notch in the underside which fits over the top of said clamping bolt.

* * * * *